United States Patent [19]

De Simone et al.

[11] 3,929,904

[45] Dec. 30, 1975

[54] PROCESS FOR THE SELECTIVE ALLYLATION OF ORTHO ALKOXY PHENOLS

[75] Inventors: Robert S. De Simone, Willingboro; Hugh E. Ramsden, Scotch Plains, both of N.J.

[73] Assignee: Rhodia, Inc., New York, N.Y.

[22] Filed: Aug. 16, 1974

[21] Appl. No.: 497,981

Related U.S. Application Data

[63] Continuation-in-part of Ser. No. 244,958, April 17, 1974, abandoned.

[52] U.S. Cl............................................. 260/613 D
[51] Int. Cl.$^2$......................................... C07C 41/00
[58] Field of Search......................... 260/613 D, 640

[56] References Cited
UNITED STATES PATENTS

| | | | |
|---|---|---|---|
| 1,787,036 | 12/1930 | Ehrlich............................ | 260/613 D |
| 2,072,015 | 2/1937 | Tamele et al....................... | 260/640 |
| 2,313,767 | 3/1943 | Pollack et al....................... | 260/640 |

OTHER PUBLICATIONS

Royals, "Advanced Org. Chem.," pp. 75–76 (1954).

Wheland, "Advanced Org. Chem.," pp. 377–386, (1949).

*Primary Examiner*—Norman Morgenstern

[57] ABSTRACT

A process is provided for the selective C-allylation in the para position of ortho-alkoxy-phenols in the presence of an alkali or alkaline earth metal hydroxide. The process is particularly advantageous for the preparation of para-eugenol from guaiacol in high yield and at low cost, relative to available procedures for the preparation of eugenol by known synthetic methods.

A process also is provided for the cleavage of the ortho-allyloxy group from 1-allyloxy-2-alkoxy-benzene using sodium metal, so as to recover and recycle the ortho-alkoxy-phenol starting material.

The two processes combine to form a cyclic process in which the ultimate product is a para-allyl-ortho-alkoxy-phenol.

25 Claims, No Drawings

PROCESS FOR THE SELECTIVE ALLYLATION OF ORTHO ALKOXY PHENOLS

This application is a continuation-in-part of Ser. No. 244,958, filed Apr. 17, 1974, and now abandoned.

Para-eugenol is regarded as one of the most important perfume and flavor ingredients, and is used extensively in perfumery as well as in the food industry. Chemically, para-eugenol is 4-allyl-2-methoxy phenol. Isoeugenol differs from eugenol in the position of the double bond, which is conjugated with the benzene ring; isoeugenol is 4-propenyl-2-methoxy phenol, and can be obtained easily and in high yield from eugenol by catalytic rearrangement of the double bond. Both eugenol and isoeugenol have an odor reminiscent of carnations. They possess a powerful spicy odor, of rather complex characteristics which offers broad possibilities in creative perfumery. They are both on the G. R. A. S. list, or "generally recognized as safe," for use in foods.

The para-eugenol of commerce is prepared almost exclusively from natural sources by simple alkali extraction from clove leaf and bud oils, cinnamon oil, and brazilian oil. Eugenol is present in pimento, calamus, cananga, camphor, sassafras, nutmeg, and other essential oils, and has also been found in a number of other plant species.

Isoeugenols are prepared from eugenols by catalytic rearrangement, and are a convenient source for the production of vanillin and ethyl vanillin.

Although synthetic methods are known by which para-eugenol can be prepared, these are not attractive for industrial application, primarily because of the difficulty attendant in carrying them out, and their high cost. The C-allylation of guaiacol with allyl chloride is the most frequently mentioned synthetic path. This can be achieved as a one-step allylation or as a two-step reaction involving alkylation first and Claisen rearrangement second. While high yields of guaiacol allyl ethers can be obtained, the Claisen rearrangement affords a mixture containing predominantly ortho-eugenol and only about 13 percent of the desired para-isomer The procedure is described in *Organic Syntheses Collective Volume* 3, p. 418. The major product of this reaction is therefore a byproduct, which has to be separated from the para-eugenol. As a result, the method is wasteful, expensive, and unsuitable for industrial application.

U.S.S.R. Pat. No. 117,492 (*Chemical Abstracts* 53, 19977c (1959)) describes the C-allylation of guaiacol and anisole with allyl chloride to obtain eugenol or estragole, respectively, using a copper catalyst. A special grade of powdered copper is employed. The eugenol fraction that is obtained is composed of 59% eugenol, 30% metaeugenol (5-allyl-2-methoxy phenol), and 10% ortho-eugenol (6-allyl-2-methoxy-phenol), provided a threefold excess of guaiacol is used in the reaction. The para-eugenol has to be separated from the reaction mixture, which in itself poses a problem.

The best chemical separation of eugenol from such a mixture is said to be by means of urethanes, obtained with carbamoyl chloride.

U.S.S.R. Pat. No. 166,019 (*Chemical Abstracts* 62, 10375e (1965)) suggests that guaiacol can be allylated using cuprous chloride $Cu_2Cl_2$ in sodium chloride solution, removing the hydrogen chloride that is liberated by treating with sodium acetate solution. The yield of eugenol based on the amount of guaiacol used is approximately 65 percent, and the reaction product is composed of about 70% para-eugenol, and 30% meta-eugenol and ortho-eugenol combined. The yield of para-eugenol is therefore about 45 percent of theory, again with the problem of separating it from the ortho- and meta-eugenol isomers.

This separation, as previously noted, is extremely difficult. It has been reported (*Chemical Abstracts* 65, 20041 (1966)) that vacuum distillation with a 24-theoretical plates column of a mixture containing about 50 to 60% para-eugenol is capable of giving only a product that is approximately 70 percent pure. Using a much higher column, corresponding to 45 theoretical plates, the para-eugenol was still only 90 percent pure, the remainder being the meta- and ortho-eugenol isomers.

In accordance with the instant invention, a method is provided for the preparation of para-eugenol, starting with guaiacol and an allyl halide, which results in a high yield of para-eugenol, substantially to the exclusion of the ortho- and meta-eugenol isomers, and is therefore suitable for production on a large scale, at a low cost, competitive with the production of eugenol from natural sources. Thus, the process of the invention frees the users of para-eugenol from dependence on a natural commodity, and its uncertain availability.

In the process of the invention, an orthoalkoxyphenol is allylated with an allyl halide or an allyl sulfate or sulfonate in the presence of an alkali or alkaline earth metal hydroxide in aqueous solution. The reaction proceeds at moderate temperatures. At the conclusion of the reaction, the mixture is acidified, and the organic material separated from the aqueous medium by extraction with an organic solvent for the allylated reaction product.

Further in accordance with the invention, the allylation is carried out in the presence of an alkali or alkaline earth metal hydroxide and an alkali metal salt in aqueous solution, with an enhanced yield of allylated reaction product, as compared to the alkali or alkaline earth metal hydroxide alone.

The allylation reaction proceeds in accordance with the following scheme:

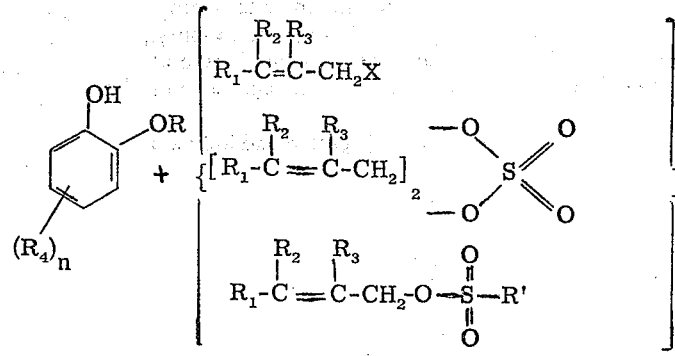

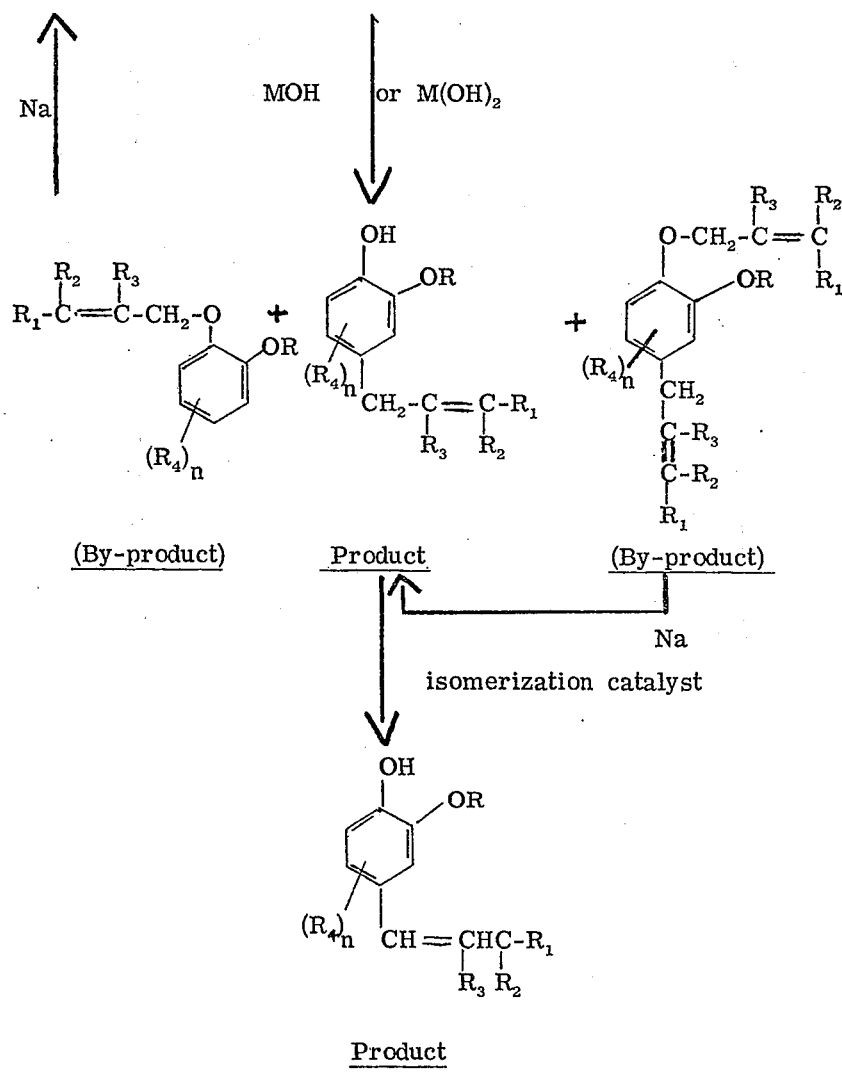

As shown in the scheme, the eugenols and homologues can be subjected to a catalytic rearrangement, so as to form isoeugenol and homologues.

In the foregoing scheme, R is an alkyl group having from one to about six carbon atoms: $R_1$, $R_2$, and $R_3$ are selected from the group consisting of hydrogen and alkyl groups having from one to about six carbon atoms, $n$ is an integer from one to three, and $R_4$ is hydrogen or methyl and is not in the para position, if it is methyl. Exemplary alkyl groups include methyl, ethyl, propyl, isopropyl, butyl, isobutyl, tertiary-butyl, secondary-butyl, amyl, isoamyl, tertiary-amyl, secondary-amyl, hexyl, isohexyl, tertiary-hexyl, and secondary-hexyl.

X is halogen, such as chlorine, bromine and iodine, a sulfonate group

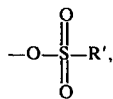

where R' can be an aliphatic or aromatic hydrocarbon moiety; R' takes no part in the reaction, and does not appear in the reaction product, so any such hydrocarbon group can be present in the allyl sulfonate, usually a group having from one to about ten carbon atoms, such as:

allyl p-toluene sulfonate
allyl naphthalene sulfonate
allyl benzene sulfonate
allyl methyl sulfonate
allyl ethyl sulfonate
allyl decyl sulfonate;

or a sulfate group

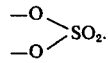

In addition to the C-allylation reaction product, and as described in the above scheme, the process of the invention also results in some O-allylation of the hydroxyl group of the starting phenol, the allyl substituent becoming attached to the phenolic oxygen. To a minor extent the eugenols themselves can be O-allylated in the same fashion. The O-allylation results in di-ethers, which are easily separated from the phenols, and in accordance with the preferred process of the invention, they are cleaved, resulting in recovery of the starting phenol, which can then be recycled.

The cleavage reaction is suitably carried out by alkali metals such as sodium, which cleave the allyl ether moiety, resulting in formation of the alkali metal salt of the phenol, which can then be acidified and the phenol recovered.

The process of the invention is characterized by its selectivity towards formation of the para-allyl isomer. Virtually no m-isomer is formed, while the proportion of o-isomer is very small. Ratios of para to ortho as high as 95.6 percent are consistently obtained. This is one of the main advantages of the invention, since the production of high purity para isomer obviates the necessity of purification procedures at high cost, while a high yield is achieved, since wasteful byproducts are not formed. The ortho-allyl-phenoxy ethers are easily cleaved to reconvert them to the starting material, so that these materials are eventually converted to the desired end product.

Any alkali or alkaline earth metal hydroxide can be employed in the C-allylation process. Sodium and potassium hydroxide, lithium hydroxide, calcium hydroxide, strontium hydroxide, and barium hydroxide are exemplary. Mixtures of these bases can also be used. Alkali and alkaline earth metal alcoholates or alkoxides of the lower aliphatic alcohols, such as potassium methylate, sodium methylate, potassium ethylate, sodium ethylate, potassium propylate, sodium propylate, potassium butylate, sodium butylate, calcium methylate, barium methylate, calcium ethylate, strontium ethylate, calcium propionate and calcium butylate, also can be used. Since the reaction is carried out in an aqueous medium, the alcoholates are hydrolyzed, producing the corresponding alkali metal or alkaline earth metal hydroxide.

The yield of allylated phenol is enhanced if with the alkali or alkaline earth metal hydroxide there is employed in addition an alkali metal salt. Any alkali metal salt enhances the yield. Exemplary are the sulfates, chlorides, nitrates, sulfites, bromides, iodides, fluorides, nitrites, cyanides, borates, carbonates, bicarbonates, phosphates, monohydrogen phosphates, dihydrogen phosphates, phosphites, acid phosphites, sulfides, acetates, formates, propionates, oxalates, tartrates, succinates, maleates, and adipates of sodium, potassium, lithium, caesium and rubidium.

The reaction proceeds with an amount of base within the range from about 0.1 mole to about 3 moles per mole of ortho-alkoxy phenol. Preferably, the amount of base is within the range from about 0.8 to about 1.1 moles per mole of ortho-alkoxy phenol.

The amount of alkali metal salt is not critical. A small amount will have a yield-enhancing effect. As little as 0.01 mole per mole of ortho-alkoxy phenol can be used. There is no reason to use more salt than alkali metal or alkaline earth metal hydroxide, so that 1.1 moles per mole of ortho alkoxy phenol is a practical maximum. Preferably, from 0.1 to about 0.75 mole is employed.

The allyl halide selected corresponds to the allyl substituent that is to be introduced into the process. In most cases, the allyl chloride is preferred because of lower cost, but the allyl bromides and allyl iodides may be more reactive, particularly in the case of high molecular weight allyl compounds. Exemplary allyl halides include allyl chloride, allyl bromide, allyl iodide, butadiene hydrochloride, butadiene hydrobromide, butadiene hydroiodide, isoprene hydrochloride, isoprene hydrobromide, isoprene hydroiodide, methallyl bromide, methallyl chloride, methallyl iodide, crotyl chloride, crotyl bromide, crotyl iodide, 2,3-dimethyallyl chloride, 2,3-dimethylallyl bromide, 2,3-dimethylallyl iodide, 3,3-diethylallyl chloride, 3,3-diethylallyl bromide, 3,3-diethylally iodide, 3-butallyl chloride, 3-butallyl bromide, 3-phenallyl chloride, 3-phenallyl bromide, 3-cyclohexylallyl chloride, 3-cyclohexyallyl bromide, 3-cyclopentylallyl chloride, 3-cyclopentylallyl bromide, and 3-stearylallyl chloride.

The invention is applicable to any ortho-alkoxy phenol in which the para position is unsubstituted. Guaiacol and homologues are of particular interest, because they result in the formation of eugenols, which in turn can lead to isoeugenols, then to vanillin, and to ethyl vanillin, or homologues. Other phenols which are allylated in accordance with the process of the invention include ortho-ethoxy-phenol, ortho-methoxy-ortho-cresol, ortho-ethoxy-ortho-cresol, ortho-methoxy-meta-cresol, ortho-propoxy-phenol, ortho-isopropoxy-phenol, ortho-butoxy-phenol, ortho-isobutoxy-phenol, ortho-tertiary-butoxy-phenol, ortho-secondary-butoxy-phenol, ortho-anyloxy-phenol, ortho-isoamyloxy-phenol, ortho-hexyloxy-phenol, and ortho-isohexyloxy-phenol.

The amount of allyl halide is within the range from about 0.25 to about 1.5 moles per mole of the ortho-alkoxy-phenol; preferably, the amount is within the range from about 0.9 to about 1.2 moles per mole of ortho-alkoxy-phenol.

The reaction is carried out in an aqueous reaction medium. The amount of water is within the range from about 50 to about 4000 ml per mole of ortho-alkoxy-phenol; preferably, the amount is within the range from about 500 to about 2000 ml per mole of ortho-alkoxy-phenol.

In order to improve the physical behaviour at the reaction temperature, small amounts of water-miscible organic solvents such as lower alkanols, lower ketones, and hydroxy amines such as triethanolamine can be included, in amounts up to about 50% by weight of the reaction medium. It is also possible, when the phenol or its alkali metal or alkaline earth metal salt is insoluble in the reaction mixture, to add a surface-active or emulsifying or dispersing agent, to aid in dispersing the resulting gel, and maintaining it in a mobile form during the reaction, thus improving physical contact and increasing the reaction rate.

The reaction proceeds relatively slowly, and consequently the order of addition of the reaction ingredients is not important. Usually, for convenience, the ortho-alkoxy-phenol is added to the aqueous solution of the base and any alkali metal salt, after which the allyl halide is added. The allyl halide can be added all at once, or gradually or continuously, in large or small increments. Alternatively, the phenol and the alkylating agent can be added simultaneously.

The reaction is usually complete within from about 2 to 100 hours reaction time at a reaction temperature within the range from about 5° to about 150°C. The preferred reaction temperature is within the range from about 15° to about 75°C.

Since the reaction is heterogeneous, agitation throughout the course of the reaction is important to maintain good physical contact and improve the reaction rate. Any means of agitation may be used.

After reaction is complete, the reaction mixture is acidified and the organic material is then extracted using a suitable water-immiscible organic solvent, which is a solvent for the eugenols as well as for the ethers.

Acidification can be effected with any suitable inorganic or organic acid, such as, for example, sulfuric acid, hydrochloric acid, phosphoric acid, acetic acid, formic acid and propionic acid. The acid may be selected so as to form a soluble salt of the cation of the base used. For example, if the base is barium hydroxide, it may be preferable to use hydrochloric acid, rather than sulfuric acid, to acidify the reaction mixture, so as to avoid a precipitate of barium sulfate. The acid may also be selected so as to make it possible to recover the base, and recycle it, in a commercial process.

The acidification can be effected in the presence of the solvent to be used for extracting the organic material. Alternatively, the solvent can be added after the acidification. Suitable solvents include chloroform, benzene, xylene, toluene, hexane, octane, decane, cyclohexane, pentane, petroleum ether, carbon tetrachloride, and trichloroethane. The solvent is water-immiscible so as to facilitate the separation of the organic layer. One or several extractions may be used.

The extract can then be treated to recover the phenols separately from the di-ethers. For example, an aqueous solution of an inorganic base, such as sodium or potassium hydroxide, can be added to convert the phenols into their water-soluble salts. They will then be separated from the di-ethers, which will remain in the solvent portion. The alkaline aqueous extracts can then be acidified with an inorganic or organic acid again, as before, to liberate the free phenols, which can then be separated by extraction with a suitable solvent, again as before. The di-ethers are in solution in the solvent, and can then be subjected to cleavage by addition of alkali metal.

It is also possible to separate the ethers and phenols by distillation.

It is also possible to perform the cleavage reaction directly in the organic solvent extract from the reaction mixture. The phenols can then be separated by distillation after acidification of the resulting alkaline solution.

Cleavage of the allyl ether group in accordance with the invention without the cleavage of the alkoxy ether group also present in the same molecule is a particular feature of the invention. It is known that allyl phenol ethers can be cleaved by addition of Grignard reagents, lithium aluminum hydride, potassium in hexamethylphosphoramide, lithium in tetrahydrofuran, and magnesium metal. Sodium is liquid ammonia has been used to cleave various phenyl alkyl ethers, with some success (Hurd and Oliver, *Journal of the American Chemical Society* 81 2795 (1959)). However, it has not previously been known to selectively cleave an allyl ether group in the presence of an alkoxy group, both ortho substituents in the benzene ring of a phenol ether.

The cleavage is carried out in the presence of a solvent. Suitable solvents include any aliphatic, cycloaliphatic, aromatic, or alkyl aromatic solvent, as well as saturated alkyl aromatic or aliphatic ethers having a boiling point above the temperature at which the reaction is carried out. The cleavage is effected in the presence of an alkali metal, such as sodium, potassium, or lithium, at a temperature within the range from about 50° to about 250°C., and preferably within the range from about 70° to about 200°C. Thus, suitable solvents include benzene, heptane, octane, kerosene, petroleum ether, toluene, xylene, anisole, decalin, cyclohexane and cyclopentane.

The solvent serves as a carrier for the insoluble alkali metal ortho-alkoxy phenolate which tends to create a viscous reaction mixture, and eventually a solid reaction mass. The amount of solvent used in that necessary to suspend the alkali metal ortho-alkoxy-phenolate.

The amount of solvent can be within the range from about 50 ml up to about 5000 ml per mole of alkali metal alkoxy phenolate; the smaller the amount of solvent, the more vigorous the agitation that is necessary. A large excess of the phenol ether can also be used as a solvent.

The amount of alkali metal is preferably the molecular amount required to cleave the ether, but larger amounts may be used, up to a molar excess of from two to three times the stoichiometric amount. It is believed that two atomic weights of alkali metal react with one molecular weight of ether, to give an alkali metal salt of the corresponding phenol and alkali metal allyl. The alkali metal allyl reacts with another molecule of ether, producing again the alkali metal salt of the phenol and a diallyl, which can be recovered as a valuable by-product.

When an excess of ether is used as the solvent, one atomic weight of alkali metal will cleave one mole of ether, the rest of the ether remaining in excess as the solvent.

The cleavage reaction proceeds quite rapidly. It can be accomplished in as little as one hour, but at the lower reaction temperatures as long as 24 hours may be required. After reaction is complete, the slurry is acidified, using an inorganic or organic acid, to a pH of about 1. Preferably, an aqueous solution of the acid is used, to dissolve the salts formed in the course of the neutralization. Any of the acids referred to above in conjunction with acidification of the allylation reaction mixture can be used.

If anhydrous acid is used, the alkali metal salt of the acid may precipitate from the organic solvent solution.

After separation of the organic phase and, if desired, extraction of the aqueous layer, the solvent is removed by distillation, recovering the ortho-alkoxy-phenol. The ortho-alkoxy-phenol is usually separated from any para-allyl-ortho-alkoxy-phenol. The ortho-alkoxy-phenol can then be recycled for further reaction.

It is also possible, in accordance with the invention, to recover the alkaline earth metal hydroxide used in the condensation reaction. For example, if barium hydroxide is used, the reaction mixture is acidified using hydrogen chloride, and the barium chloride reconverted to barium hydroxide in an exchange reaction with sodium hydroxide. The solubility of barium hydroxide is about nine times less than that of sodium chloride, thus making it possible to recover the barium hydroxide in yields in excess of 90 percent. The recovered barium hydroxide can then be recycled. The same process can be applied to recover strontium hydroxide. In this manner the condensing agent consumed in this reaction can be ultimately an inexpensive alkali metal hydroxide.

The following Examples, in the opinion of the inventors, represent preferred embodiments of the invention:

EXAMPLE 1

Into a five-liter flask equipped with thermometer, Bodine stirrer (variable speed) and Friedrich condenser was charged:

1200 g of city water and
410 g of $Ba(OH)_2 \cdot 8H_2O$ (1.30 mole) under a static nitrogen head.
160 g of guaiacol was then added (1.29 mole) with stirring, followed by
108.2 g of allyl chloride (1.41 mole) added in one portion with stirring at 25°C. The resulting mixture was stirred at 25°C to 27°C., for 64 hours.
400 g of xylene was then added, followed by dropwise addition of
135 g of 36.5% aqueous HCl (1.35 mole) solution to a pH of 1, with stirring and cooling to maintain the reaction temperature at 25°C. The xylene layer (A) was separated and the water layer extracted with chloroform, in order to ensure complete removal of guaiacol, which remained in the water layer to the extent of about 2 percent. The xylene layer (A) was then extracted with an aqueous solution of
25.8 g of caustic (0.645 mole) in
75 g of water, to regain unreacted guaiacol and eugenol. The xylene layer (A) was extracted twice more with
3 g of caustic (0.075 mole) in
11 g of water.
To the combined aqueous extracts were added
51.6 g of xylene and
80 g of 36.5% aqueous HCl solution (0.80 mole).
After this xylene layer (B) was separated, the remaining aqueous layer was extracted with chloroform, to ensure complete recovery of phenols.

The chloroform was recovered atmospherically, and the xylene distilled at 145 to 40 mm at a vapor temperature ranging from 27° to 54°C. The remaining oil was flash distilled at high vacuum to yield:
60.4 g para-guaiacol 3.11 g para-guaiacol allyl ether
45.9 g para-eugenol
0.6 g para-eugenol allyl ether
3.2 g residue The xylene layer (A) after caustic extraction was brought to reflux, to remove traces of water azeotropically, and then cooled under a static nitrogen head before addition of
15.7 g of sodium metal spheres (0.39 mole). The solution was brought to reflux over a period of ¾ hour, and held at reflux for 2 hours to cleave the allyl ethers. After cooling to ambient temperature, water was added slowly dropwise, with stirring, to digest traces of unreacted sodium.

100 g of water in two successive 50 ml portions was used to extract guaiacol and eugenol sodium salts (cross washing of the aqueous layers was made with 21.5 g of xylene). The aqueous solution was neutralized with
40 g of 36.5% aqueous HCl and extraction made with 172 g of xylene to recover phenols (the aqueous layer was further extracted with chloroform to ensure complete recovery of phenols). After solvent recovery the product was flash distilled at high vacuum to yield 32.2 g of guaiacol, 4.9 g of para-eugenol and 2.2 g of residue.

Material remaining in the xylene layer after the sodium cleavage reaction was regained by flash distillation at high vacuum, after distillative recovery of xylene, to yield 7.5 g guaiacol allyl ether, 0.64 g paraeugenol, and 3.5 g of para-eugenol allyl ether.

The total yield was: para-eugenol 51.4 g, guaiacol allyl ether 10.65 g, para-eugenol allyl ether 4.09 g.

From 1.29 moles guaiacol starting material, this represents:

a 76.2% true yield in the alkylation step (EAE and GAE taken as free phenols),
a 24.4% direct yield overall,
a 68.3% true yield overall (remaining EAE and GAE taken as free phenols), and
a 95.6% ratio of para to ortho eugenol produced (ratio in percent) in the initial alkylation step.

EXAMPLES 2 TO 22

The procedure of Example 1 was repeated, substituting the alkali or alkaline earth metal hydroxides and various reaction conditions shown in Table I. The yields obtained are given in the Table.

TABLE I

| Ex. | Moles Hydroxide per Mole Guaiacol | Moles Allyl Cl per Mole Guaiacol | g Solvent per Mole Guaiacol | Time (hr.) | Temp. °C. | % Para Eugenol[1] | % C Allylation[2] | % EAE[3] | % HBs[4] | % Unreacted Guaiacol | Mat. Bal. | Direct Yield | True Yield[5] |
|---|---|---|---|---|---|---|---|---|---|---|---|---|---|
| 2 | 1M Ba(OH)$_2$ | 1.1 | 930 | 67 | 25 | 95.6 | 43.2 | 4.6 | 8.4 | 20.8 | 99.0 | 24.4 | 68.3 |
| 3 | 1M Ba(OH)$_2$ | 1.2 | 940 | 96 | 15 | 95.0 | 45.8 | 2.6 | 4.7 | 60.4 | 100. | 11.5 | 75.5 |
| 4 | 1M Ba(OH)$_2$ | 1.1 | 930 | 67 | 35 | 95.1 | 43.7 | 5.9 | 8.9 | 27.8 | 100. | 28.8 | 73.5 |
| 5[6] | 1M Ba(OH)$_2$ | 1.2 | 930 | 96 | 25 | 94.3 | 45.8 | 5.3 | 7.0 | 22.0 | 100. | 28.6 | 76.7 |
| 6[7] | 1M Ba(OH)$_2$ | 1.7 | 940 | 72 | 31 |  | 38.8 | 8.2 | 12.1 | 47.0 |  |  |  |
| 7[8] | 2M Ba(OH)$_2$ | 1.2 | 1880 | 79 | 25 | 93.3 | 46.4 | 5.2 | 5.4 | 27.3 |  |  |  |
| 8 | 1/2M Ba(OH)$_2$ | 1.0 | 940 | 72 | 25 | 83. | 43.2 | 3.8 | 6.1 | 26.4 | 100. | 21.5 | 62.4 |
| 9 | 1M Ba(OH)$_2$ | 1.2 | 940 | 20 | 50 | 76.3 |  |  |  |  |  |  |  |
| 10* | 1M Ba(OH)$_2$ | 1.2 | 940 | 48 | 25 | 96.5 | 45. | 4.6 | 7.3 | 28.7 | 94.3 | 25. | 66.7 |
| 11 | 1M Ca(OH)$_2$ | 1.0 | 750 | 70 | 25 | 89.5 | 42.7 | 1.0 | 1.9 | 73. | 90.0 | 6.8 | 42.0 |
| 12* | 1M Ca(OH)$_2$ | 1.0 | 940 | 95 | 25 | 92.3 | 42.5 | 2.5 | 3.1 | 60. | 99.5 | 12.7 | 73.8 |
| 13 | (0.75M NaOH and (0.25M Ca(OH)$_2$ | 1.2 | 930 | 113 | 25 | 83.5 | 44.7 | 3.3 | 1.8 | 19. | 100. | 29.7 | 73.0 |
| 14 | 1.5M NaOH | 1.0 | 940 | 113 | 25 | 88.0 | 33.1 | 12.0 | 10.6 | 22. | 96.5 | 16. | 56.3 |

TABLE I-continued

| Ex. | Moles Hydroxide per Mole Guaiacol | Moles Allyl Cl per Mole Guaiacol | g Solvent per Mole Guaiacol | Time (hr.) | Temp. °C. | % Para Eugenol[1] | % C Allylation[2] | % EAE[3] | % HBs[4] | % Unreacted Guaiacol | Mat. Bal. | Direct Yield | True Yield[5] |
|---|---|---|---|---|---|---|---|---|---|---|---|---|---|
| 15 | 1.5M NaOH | 1.0 | 940 | 64 | 25 | 89.0 | 37.1 | 12.1 | 11.0 | 22.4 | 91.5 | 11.2 | 48.1 |
| 16 | 1M NaOH | 1.0 | 940 | 72 | 25 | 81.8 | 47.0 | 5.3 | 3.1 | 17. | 95.4 | 27.4 | 62.3 |
| 17 | 1M NaOH | 1.0 | 310 | 64 | 25 | 81.1 | 46.5 | 7.0 | 4.3 | 13.2 | 87.5 | 27.3 | 61.0 |
| 18 | 1M NaOH | 1.0 | 78 | 76 | 25 | 78.3 | 44.2 | 12.9 | 3.9 | 24.8 | 100. | 20.4 | 73.5 |
| 19 | (0.5M NaOH and (0.5M Ba(OH)₂ | 1.0 | 940 | 89 | 25 | 95.3 | 37.9 | 5.6 | 5.8 | 44. | 97.0 | 13.7 | 55.8 |
| 20* | (0.75M NaOH and (0.25M Ba(OH)₂ | 1.0 | 940 | 24 | 25 | 89.0 | 48.7 | 5.2 | 4.8 | 22. | 100. | 28.3 | 73.3 |
| 21 | (0.1M Ba(OH)₂ and (0.7M NaOH | 1.0 | 940 | 29 | 82.6 | 46.7 | 0.9 | 0.3 | 39. | 94.3 | 19.2 | 59.8 | |
| 22 | 1M Sr(OH)₂ | 1.0 | 940 | 72 | 25 | 94 | 37.3 | 7.1 | 6.6 | 28.9 | 100. | 20.5 | 53.6 |

[1]Ratio of para to ortho eugenol expressed as a percentage of the total.
[2]Ratio of free eugenol (C-allylate) to guaiacol allyl ether (O-allylate) expressed as a percentage of the total.
[3]EAE = para-eugenol allyl ether.
[4]All diallylated and triallylated materials other than EAE.
[5]True yield based on 90% recovery of guaiacol and eugenol from the corresponding allyl ethers via the Na cleavage step.
*6% Triton X-100 present (condensation product of ethylene oxide and octyl phenol).
[7]2M NaCl present.
*12% Triton X-100 present.

EXAMPLES 23 to 33

The procedure of Example 1 was repeated under the reaction conditions shown in Table II.

EXAMPLE 35

A mixture of 10.5 g of sodium beads and 250 ml of xylene under nitrogen was heated to 130°, whereupon a

TABLE II

| Ex. | Moles Base per Mole Guaiacol | Moles Allyl Cl per Mole Guaiacol | G. Water per Mole Guaiacol | Time (hrs.) | Temp. °C. | % Eugenol[1] | % C-Allylation[2] | % EAE[3] | % High Boilers[4] | Direct Yield |
|---|---|---|---|---|---|---|---|---|---|---|
| 23 | 1.0 Ba(OH)₂ | 0.5 | 937 | 2 | 60-98 | 86.5 | 38 | 11.9 | 3.4 | 13.2% |
| 24 | 0.76 Ba(OH)₂ | 0.5 | 400 | 2.5 | 60-98 | 90 | 46 | 13.5 | 2.6 | |
| 25 | 1.0 Ba(OH)₂ | 1.1 | 930 | 96 | 15 | 95.0 | 45.8 | 14.8 | 7.3 | 11.5%-60.7%[5] |
| 26 | 1.06 Ba(OH)₂ | 1.06 | 1000 | 2.5 | 80 | 89 | 21 | 10-15 | 40-50 | |
| 27 | 0.95 Ba(OH)₂ | 0.5 | 1800 | 2.5 | 45-99 | 78 | 42 | 5-10 | | |
| 28 | 1.0 Ba(OH)₂ | 0.5 | 937 | 2 | 60-98 | 87 | 38 | 10.3 | 3.4 | 7.7% |
| 29 | 0.76 Ba(OH)₂ | 0.5 | 400 | 2.5 | 60-98 | 90 | 46 | 12.1 | 13.8 | 13.2% |
| 30 | 0.93 Ba(OH)₂ | 0.27 | 937 | 2 | 60-99 | 82 | 49 | 15.3 | trace | 11.1% |
| 31 | 0.93 Ba(OH)₂ | 0.27 | 937 | 20 | RT | 90 | 50 | 15.1 | 2.0 | 12% |
| 32 | 0.39 Ba(OH)₂ | 0.45 | 100 | 1.2 | 31-100 | 80 | 54 | 4.9 | | |
| 33 | 0.85 Ca(OH)₂ | 0.81 | 940 | 16 | RT | 90 | 44 | trace | nil | |
| | | | | 7 | 50-100 | 90 | 41 | trace | nil | |

[1]Ratio of para to ortho eugenol expressed as a percentage of the total.
[2]Ratio of free eugenol (C-allylate) to guaiacol allyl ether (O-allylate) expressed as a percentage of the total.
[3]EAE = para-eugenol allyl ether.
[4]All diallylated and triallylated materials other than EAE.
[5]True yield based on 90% recovery of guaiacol and para-eugenol from the corresponding allyl ethers via the Na cleavage step.

EXAMPLE 34

To 300 ml of xylene under a static nitrogen head was added 9.5 g of sodium beads and 0.1 g of Neofat 265 (distilled coconut oil fatty acids) and the mixture heated to 98°C. with mechanical stirring. A solution of 49 g guaiacol allyl ether in 20 ml of xylene was then added, and the mixture stirred at 92° to 98°C., until evolution of heat ceased (about 20 minutes). After standing at room temperature overnight, the reaction mass was held at 140°C. for approximately two hours under nitrogen, with stirring. The cooled slurry was then acidified to pH 1 with HCl, the organic phase separated, and the aqueous phase extracted with chloroform. The combined organic phases were concentrated under aspirator vacuum, and then flash distilled at high vacuum to give a mixture of 28.1 g of guaiacol and 5.7 g of guaiacol allyl ether. Direct yield 73.7 percent; true yield 82.5 percent; material balance in distillate 85 allyl solution of 19.3 g guaiacol, 23.4 g guaiacol allyl ether (GAE), 22.7 g paraeugenol, 2.9 g para-eugenol ally ether (EAE) and 6.8 g other high boilers (gas-liquid chromatographic analysis) in 50 ml of xylene was added over 25 minutes with stirring. The reaction mixture was held at reflux for two hours more, and cooled to room temperature. The resulting slurry was neutralized to pH 1 using 10% HCl at 35°C or lower. The organic phase was separated, and the aqueous layer cross-extracted with chloroform. The combined organic phases were vacuum-concentrated prior to flash distillation at 1.2 to 2.2 mm Hg, 70°-116° vapor temperature, yielding 73.7 g of distillate comprising 31.6 g guaiacol, 2.9 g guaiacol allyl ether, 27.0 g eugenol (mixture of ortho and para) and 3.9 g of high boilers, as per gas-liquid chromatographic analysis.

EXAMPLE 36

A mixture of 2.3 g sodium metal in 400 ml heptane was heated to 100° under nitrogen with high speed stirring and then cooled to room temperature while stirring (a sodium sand was produced). A solution of 16.4 g guaiacol allyl ether in about 40 ml of heptane was added at 36°C. and the mixture allowed to stir at room temperature overnight. A sample of the resulting turbid yellow solution, when worked up in an appropriate manner, showed 1% guaiacol present with guaiacol allyl ether. The reaction mixture was then heated to reflux (100°C.) for a total of 20 hours. Samples at 2 hours, 5.5 hours, and 20 hours showed 7, 10 and 30% guaiacol, respectively. The cooled reaction mixture was neutralized with HCl to pH 1, the organic phase separated, and the aqueous phase extracted with chloroform. The combined organic phases were vacuum concentrated at 15 mm, 50°C. and flash distilled at 1 to 3 mm to give 4.9 g guaiacol and 6.8 g of guaiacol allyl ether - direct yield 36.5 percent; true yield 63 percent; material balance in distillate = 78 percent.

| Sample | Time (hr.) | % Guaiacol Formed |
|---|---|---|
| 1 | 0.25 | 58 |
| 2 | 3 | 71 |
| 3 | 10 | 83 |
| 4 | 16 | 90.4 |

EXAMPLES 38 to 42

The procedure in Example 34 was repeated under the conditions listed in Table III, using a variety of solvents, as shown in the Table (Neofat 265 was omitted in these runs):

TABLE III

| Example | Solvent | Temp. Range (°C) | Time (hrs.) | Moles Na per mole of Ether | ml Solvent per Mole GAE | Direct Yield | True Yield | Material Balance |
|---|---|---|---|---|---|---|---|---|
| 38 | xylene | 100–138 | 4.5 | 1.05 | 575 | 80.7% | 86.7% | 96.4% |
| 39 | decalin* | 125–192 | 4.3 | 1.08 | 730 | 47.4 | — | 53.3 |
| 40 | anisole | 145–153 | 4.3 | 1.1 | 600 | 92.7 | 92.7 | 100 |
| 41 | heptane | 85–93 | 4.7 | 1.1 | 600 | 93.3 | 95.3 | 100 |
| 42 | benzene | 69–84 | 21 | 1.08 | 850 | 49.1 | 67.8 | 77 |

*Guaiacol produced was extracted from the reaction medium with caustic; unreacted guaiacol allyl ether was not recovered in this case.

EXAMPLE 37

Into a nitrogen-purged flask was charged 300 ml of xylene, 0.3 g of Neofat 265 (distilled coconut oil fatty acids) and 11.7 g of sodium metal, and the mixture heated to reflux (146°C.) while 63 g of guaiacol allyl ether was added over a 20-minute period. Reflux was continued for 16 hours. The results are given below, as per gas-liquid chromatographic analysis:

EXAMPLES 43 to 53

A variety of surface active agents were used to facilitate contact of the reagents in the allylation step, and to provide a more mobile reaction medium (Examples 43 to 48). Several different solvent mixtures were also used, essentially to achieve the same effect (Examples 49 to 53). Table IV shows the results obtained in these runs.

TABLE IV

| Ex. | g Solvent per Mole Guaiacol | Time (hrs.) | Temp. (°C) | Ratio in % of para to ortho Eugenol | Ratio in % of C- to O- Allylation | % para Eugenol Allyl Ether | % High Boilers | % Unreacted Guaiacol | Direct Yield | True Yield | Comments |
|---|---|---|---|---|---|---|---|---|---|---|---|
| (a) Surface Active Agents | | | | | | | | | | | |
| 43 | 930 H$_2$O | 66 | 30 | 94.0 | 44.5 | 3.6 | 9.6 | 26.7 | 24.5 | 70.1 | 6.2g/M Rozak[1] AOD 30 |
| 44 | 930 H$_2$O | 64 | 25 | 94.8 | 46.2 | 3.3 | 7.1 | 28.5 | 22.6 | 64.7 | 6.2g/M Sellogen HR[2] |
| 45 | 930 H$_2$O | 64 | 24 | 95.2 | 44.7 | 3.6 | 5.8 | 36.0 | 19.4 | 57.5 | 6.2g/M Ultra CD-22A[3] |
| 46 | 930 H$_2$O | 66 | 27 | 95.5 | 47.1 | 3.5 | 7.6 | 36.0 | — | — | 4g/M Neofat 265[4] and triethanol amine (m/m) |
| 47 | 930 H$_2$O | 72 | 25 | 94.5 | 36.8 | 3.3 | 6.3 | 43.3 | 16.9 | 61.0 | 5 mole % of EDTA[5] |
| 48 | 930 H$_2$O | 72 | 25 | 95.0 | 43.5 | 3.3 | 8.7 | 28.8 | 22.5 | 61.2 | 5 % Na$_3$ PO$_4$ —12 H$_2$O |
| (b) Variations in Solvent Composition | | | | | | | | | | | |
| 49 | 700 H$_2$O | 72 | 29 | 94.0 | 43.5 | 2.9 | 5.1 | 53.1 | 13.5 | 66.5 | 25% less H$_2$O |
| 50 | 1160 H$_2$ | 72 | 30 | 95.7 | 51.3 | 4.7 | 9.4 | 23.1 | 24.2 | 60.4 | 25% extra H$_2$O |
| 51 | 840 H$_2$O 93 ethylene glycol | 65 | 27 | 95.1 | 43.2 | 3.3 | 6.3 | 35.2 | 20.1 | 69.3 | |
| 52 | 840 H$_2$O 93 N-Methylpyrollidone | 72 | 25 | 93.5 | 31.1 | 4.9 | 4.7 | 31.6 | 14.7 | 79.2 | |
| 53 | 840 H$_2$O 93 formamide | 72 | 25 | 77.5 | 50.3 | trace | trace | 68.5 | 9.8 | 64.2 | |

[1] A fatty alcohol ethoxylated and phosphated.
[2] A sodium dialkyl naphthalene sulfonate.
[3] A linear sodium alkyl benzene sulfonate.
[4] Distilled coconut oil fatty acids.
[5] Ethylene diamine tetraacetic acid.

EXAMPLES 54 to 56

Results obtained with allylating agents other than allyl chloride using the reaction procedure of Example 1 are entered in Table V under the conditions shown.

product), which was confirmed as being 4-(3,3-dimethallyl)-guaiacol by independent synthesis. The direct yield of 4-prenyl guaiacol was 20.3 percent, true yield 74.3 percent with a material balance of 94.3 percent.

TABLE V

| Ex. | Moles Hydroxide per Mole Guaiacol | Moles Allylhalide or sulfonate per Mole Guaiacol | g Water per Mole Guaiacol | Time (hrs.) | Temp. (°C) | Ratio in % of para to ortho Eugenol | Ratio in % of C- to O- Allylation | % para Eugenol Allyl Ether | % High Boilers | % Unreacted Guaiacol | Direct Yield | True Yield |
|---|---|---|---|---|---|---|---|---|---|---|---|---|
| 54 | 1.01 | 1.09 Allyl halide | 930 | 68 | 27 | 93.7 | 36.5 | trace | trace | 89.5 | 2.8 | 64.3 |
| 55 | 1.01 | 1.2 Allyl bromide | 930 | 72 | 25–36 | 97.5 | 46.7 | 8.2 | 14.4 | 18.9 | 26.8 | 70.2 |
| 56 | 1.01 | 1.1 Allyl para toluene sulfonate | 930 | 141 | 27 | 98.1 | 35.1 | 6.8 | 8.6 | 27.7 | 19.0 | 58.6 |

EXAMPLES 57 to 60

Allylation of a series of catechol mono alkyl ethers using the procedure of Example 1 under the conditions shown gave the results listed in Table VI.

EXAMPLE 62

Guaiacol (1.0 mole, 124 grams) was dissolved with stirring in a solution of sodium hydroxide (0.5 mole, 20 grams) and sodium carbonate (0.25 mole, 26.5 grams) in 500 ml of distilled water.

TABLE VI

| Example | Substrate | Moles Hydroxide per Mole Catechol Ether | g Water per Mole Catechol Ether | Time (hrs.) | Temp. (°C) | Ratio in % of 4 to 2-allyl[1] | Ratio in % of C-to-O-Allyation[2] | % EAE Homologues[3] | % HBS | % Unreacted Guaiacol Homologues | Material Balance | Direct Yield | True Yield |
|---|---|---|---|---|---|---|---|---|---|---|---|---|---|
| 57 | Ethanol | 0.91 | 838 | 72 | 25 | 96.0 | 39.2 | 5.7 | 8.2 | 28.0 | 96.3 | 19.7 | 60.0 |
| 58 | Catechol Mono n-propyl Ether | 1.01 | 930 | 68 | 25 | 94.3 | 37.4 | 2.3 | 2.3 | 61.7 | 99.1 | 10.1 | 65.8 |
| 59 | Catechol Mono Isopropyl Ether | 1.01 | 930 | 88 | 25 | 85.5 | 32.5 | 8.4 | 6.3 | 15.6 | 98.5 | 18.2 | 56.8 |
| 60 | Catechol Mono n-Butyl Ether | 1.01 | 930 | 72 | 25 | 85.7 | 38.2 | trace | trace | 78.8 | 100.3 | 5.9 | 80.5 |

[1] Ratio in percent of para eugenol homologue over the total of ortho- and para-eugenol homologues produced.
[2] Ratio in percent of free allyl phenol (C-allyl) over the total of C-allyl and O-allyl guaiacol homologues produced.
[3] Percent of para eugenol homologue allyl ether (EAE).

EXAMPLE 61

Into a three liter flask equipped with a Bodine stirrer, Friedrichs condenser and means for maintaining a static nitrogen head was charged 600 g of water, 205 g of barium hydroxide octahydrate (0.65 mole), 80 g (0.65 mole) guaiacol, and 75 g of 1-chloro-3-methylbutene-2 (0.717 mole). After stirring at ambient temperature for 160 hours, the reaction mixture was brought to pH 1 using 100 ml of concentrated HCL with stirring in the presence of 100 ml of chloroform. The chloroform layer was separated and the aqueous phase extracted three more times with 100 ml portions of chloroform. The chloroform was removed from the product atmospherically through a one-foot Vigreaux column to a pot temperature of 128° C., head temperature 75° C. Flash distillation of the remaining oil at 1.5 mm Hg, at a vapor temperature range of 75° to 170°C., gave 89.3 g of distillate and 8.5 g of residue. The distillate showed 59% guaiacol, 32% C-Allylate and 8.0% O-Allylate (prenyl ether) by glc analysis. The C-Allylate consisted of one major peak (29 percent of total The stirred mixture (a gray slurry) was allowed to cool to 35°C, and 1.0 mole (76.5 g) of allyl chloride was added over a period of 26 minutes. The mixture was stirred at room temperature for 64.5 hours, then heated to 98°C over a period of 5 hours, and finally cooled.

The cooled mixture separated into an organic layer and an aqueous layer. These were separated and the aqueous layer extracted twice with 100 ml portions of cyclohexane. The extracts and the organic layer were combined and stripped of solvent in a vacuum still.

The residue was vacuum-distilled to yield two cuts, 83.6 g boiling to 75° C at 0.05 mm and 60.0 g boiling to 92° C at 0.2 mm, with a residue of 0.5 g. Analysis of these samples by gas chromatography showed the following (combined for the two fractions): Guaiacol 38.52 g; guaiacol allyl ether 49.4 g; ortho-eugenol 10.2 g; para-eugenol 43.0 g; p-eugenol allyl ether 1.43 g; and o-eugenol allyl ether 0.76 g.

Acidification of the above aqueous layer and extraction with two 100 ml portions of ethyl ether followed by stripping of solvent and distillation gave 1.1 g of distillate and 0.2 g of residue. Analysis by gas liquid chromatography showed the following: guaiacol 85.8%, guaiacol allyl ether 7.9%; o-eugenol 1.1%, p-eugenol 3.5%; p-eugenol allyl ether 0.9% and o-eugenol allyl ether 0.6%.

From these data the direct yield of p-eugenol is seen to be 26.9 percent, with a conversion yield (true yield) of 74.5 percent.

EXAMPLE 63

Guaiacol (1.0 mole, 124 grams) was dissolved with stirring in a solution of sodium hydroxide (0.75 mole, 30 grams) and sodium carbonate (0.25 mole, 26.5 grams) in 800 ml of distilled water.

The stirred mixture (a gray slurry) was allowed to cool to 35° C, and 1.0 mole (76.5 g) of allyl chloride was added over a period of 26 minutes. The mixture was stirred at room temperature for 64.5 hours.

The cooled mixture separated into an organic layer and an aqueous layer. These were separated and the aqueous layer extracted twice with 100 ml portions of cyclohexane. The extracts and the organic layer were combined and stripped of solvent in a vacuum still.

The residue was vacuum-distilled to yield two cuts, 116.9 g boiling to 93°C at 0.7 mm, and 27.7 g boiling to 150°C at 1.0 mm. Analysis of these samples by gas chromatography showed the following (combined for the two fractions): Guaiacol 34.1 g; guaiacol allyl ether 50.9 g; ortho-eugenol 9.9 g; para-eugenol 47.7 g; p-eugenol allyl ether 0.9 g; and o-eugenol allyl ether 0.7 g.

Acidification of the above aqueous layer and extraction with two 100 ml portions of ethyl ether followed by stripping of solvent and distillation gave 4.0 g of distillate. Analysis by gas liquid chromatography show guaiacol 94.8 percent.

From these data the direct yield of p-eugenol is seen to be 29.7 percent, with a conversion yield (true yield) of 76.9 percent.

EXAMPLE 64

A solution of 1.0 mole of sodium hydroxide, 0.5 mole of trisodium citrate, and 1.0 mole of guaiacol in 800 ml of water was cooled to 11°C and 1.0 mole of allyl chloride added dropwise over a 30 minute period. The mixture was stirred and allowed to warm up to room temperature. Total stirring was for 16 hours. The mixture was then heated to 55°C over a period of 1 hour. It was then cooled.

The cooled mixture separated into an organic layer and an aqueous layer. These were separated and the aqueous layer extracted twice with 100 ml portions of cyclohexane. The extracts and the organic layer were combined and stripped of solvent in a vacuum still.

The residue was vacuum-distilled to yield two cuts, 98.3 g boiling to 114°C at 0.07 mm, and 30.3 g boiling to 160°C at 0.6 mm, with a residue of 0.5 g.

Acidification of the aqueous layer and extraction with two 100 ml portions of ethyl ether followed by stripping of solvent and distillation gave 21.3 g of distillate.

Analysis of the combined fractions by gas chromatography showed the following: Guaiacol 32.9 g; guaiacol allyl ether 53.0 g; ortho-eugenol 10.37 g; para eugenol 44.0 g; p-eugenol allyl ether 5.8 g; and o-eugenol allyl ether 3.48 g.

From these data the direct yield of p-eugenol is seen to be 29.7 percent, with a conversion yield (true yield) of 72.1 percent.

EXAMPLE 65

Guaiacol (1.0 mole, 124 grams) was dissolved with stirring in a solution of sodium hydroxide (1.0 mole, 40 grams) and sodium acetate (0.5 mole, 41 grams) in 500 ml of distilled water.

The stirred mixture (a gray slurry) was cooled to 17° C, and 1.0 mole (76.5 g) of allyl chloride was added over a period of one hour. The mixture was stirred at room temperature for 16 hours, then heated to 100° C over a period of 2 1/2 hours, and finally cooled.

The cooled mixture separated into an organic layer and an aqueous layer. These were separated and the aqueous layer extracted twice with 100 ml portions of cyclohexane. The extracts and the organic layer were combined and stripped of solvent in a vacuum still.

The residue was vacuum-distilled to yield two cuts, 102.5 g boiling to 99°C at 0.2 mm, and 52.8 g boiling to a pot temperature of 185°C at 1.4 mm.

Acidification of the above aqueous layer and extraction with two 100 ml portions of ethyl ether followed by stripping of solvent and distillation gave 1.7 g of distillate. Analysis by gas liquid chromatography showed the following: guaiacol 72.6%; guaiacol allyl ether 5.18%; o-eugenol 0.95%; p-eugenol 4.11%; p-eugenol allyl ether 3.13%; and o-eugenol allyl ether 4.53%.

Analysis of the three combined distillate fractions by gas chromatography showed the following: Guaiacol 17.84 g; guaiacol allyl ether 64.4 g; ortho-eugenol 11.98 g; para-eugenol 48.1 g; p-eugenol allyl ether 8.69 g; and o-eugenol allyl ether 5.47 g.

From these data the direct yield of p-eugenol is seen to be 33.6 percent, with a conversion yield (true yield) of 72.5 percent.

EXAMPLE 66

Guaiacol (1.0 mole, 124 grams) was dissolved with stirring in a solution of sodium hydroxide (1.0 mole, 40 grams) and potassium sulfate (1 mole, 174 grams) in 800 ml of distilled water.

The stirred mixture (a gray slurry) was allowed to cool to 35°C, and 1.0 mole (76.5 g) of allyl chloride was added at 34°–38°C over a period of 2 hours. The mixture was stirred at room temperature for 65 hours.

The cooled mixture separated into an organic layer and an aqueous layer. These were separated and the aqueous layer extracted twice with 100 ml portions of cyclohexane. The extracts and the organic layer were combined and stripped of solvent in a vacuum still.

The residue was vacuum-distilled to yield a cut, 128.3 g boiling to a pot temperature of 140°C at 0.4mm.

Acidification of the above aqueous layer and extraction with two 100 ml portions of ethyl ether followed by stripping of solvent and distillation gave 26.3 g of distillate. Analysis by gas liquid chromatography showed the following: guaiacol 54.29%, guaiacol allyl ether 21.7%; o-eugenol 3.77%; p-eugenol 19.16%; p-eugenol allyl ether 0.77% and o-eugenol allyl ether 0.24%.

The two distillate fractions were combined and analyzed by gas chromatography. The following was found: Guaiacol 26.3 g; guaiacol allyl ether 60.9 g; ortho-eugenol 10.77 g; para-eugenol 47.83 g; p-eugenol allyl ether 5.6 g; and o-eugenol allyl ether 3.3 g.

From these data the direct yield of p-eugenol is seen to be 31.9 percent, with a conversion yield (true yield) of 76.6 percent.

EXAMPLE 67

Guaiacol (1.0 mole, 124 grams) was dissolved with stirring in a solution of sodium hydroxide (1.0 mole, 40 grams) and sodium acetate (0.5 mole, 41 grams) in 500 ml of distilled water.

The stirred mixture (a gray slurry) was heated to 45°C, and 1.0 mole (76.5 g) of allyl chloride was added over a period of 42 minutes. The mixture was then heated to 98°C over a period of 43 minutes, and cooled.

The cooled mixture separated into an organic layer and an aqueous layer. These were separated and the aqueous layer extracted twice with 100 ml portions of cyclohexane. The extracts and the organic layer were combined and stripped of solvent in a vacuum still.

the residue was vacuum-distilled to yield two cuts, 104.6 g boiling to 93°C at 1.4 mm and 27.6 g boiling to a pot temperature of 145°C at 1.4 mm. Analysis of these samples by gas chromatography showed the following (combined for the two fractions): Guaiacol 14.65 g; guaiacol allyl ether 61.93 g; orthoeugenol 10.88 g; para-eugenol 34.33 g; p-eugenol allyl ether 6.75 g; and o-eugenol allyl ether 3.57 g.

Acidification of the above aqueous layer and extraction with two 100 ml portions of ethyl ether followed by stripping of solvent and distillation gave 7.9 g of distillate. Analysis by gas liquid chromatography showed the following: guaiacol 89.61%; guaiacol allyl ether 1.42%; o-eugenol 0.3%; p-eugenol 1.96%; p-eugenol allyl ether 1.2% and p-eugenol allyl ether 1.41%.

From these data the direct yield of p-eugenol is seen to be 24percent, with a conversion yield (true yield) of 54.6 percent.

EXAMPLE 68

Guaiacol (0.5 mole, 62.0 g) was added with stirring into a solution of sodium hydroxide (0.5 mole, 20 g) in 300 ml of distilled water.

The stirred mixture was allowed to cool to room temperature. Allyl chloride (0.5 mole, 38.3 g) was then added dropwise over a period of 15 min. The mixture was then heated to 90°–95°C, and stirred at this temperature for four hours.

The cooled mixture separated into an organic layer and an aqueous layer. The layers were separated, and the aqueous layer extracted twice with 100 ml portions of cyclohexane. The extracts and the organic layer were combined, and stripped of solvent under vacuum. The residue was vacuum distilled to yield 64.5 g of material boiling up to 110° C at 0.5 mm Hg. Analysis of this sample by gas liquid chromatography showed the following: Guaiacol recovered, 5.64 g, guaiacol allyl ether, 32.4 g; o-eugenol allyl ether 3.88 g; and p-eugenol allyl ether 1.99 g.

Acidification of the above aqueous layer and extraction with three 100 ml portions of diethyl ether followed by stripping of solvent and vacuum distillation gave 8.0 g of distillate boiling up to 84°C at 0.02 mm Hg. Analysis by gas liquid chromatography showed the following: Guaiacol recovered, 7.62 g; guaiacol allyl ether 0.10 g; o-eugenol, 0.03 g; p-eugenol 0.20 g; p-eugenol ether 0.02 g; and o-eugenol allyl ether 0.01 g.

From these data the direct yield of p-eugenol is seen to be 18.8 percent, or a true yield of 58.1 percent, based on guaiacol consumed.

EXAMPLE 69

Guaiacol (0.5 mole, 62 g) was added with stirring into a solution of 20 g (0.5 mole) sodium hydroxide in 300 ml of distilled water. The stirred mixture was allowed to cool to a room temperature. Then, 38.3 g allyl chloride (0.5 mole) was added dropwise over a period of 15 minutes. The mixture was then introduced into an autoclave, and brought to a temperature of 115°C at a pressure of 50 psi. These conditions were maintained for one hour, after which the reaction mixture was cooled.

The cooled mixture separated into an organic layer and an aqueous layer. They were separated and the aqueous layer extracted twice with 100 ml portions of cyclohexane. The extracts and the organic layer were combined and stripped of solvent under house vacuum. The residue was vacuum distilled to yield 51.5 g of material boiling up to 142°C at 0.6 mm Hg. Analysis of this sample by gas liquid chromatography showed the following: Guaiacol recovered, 10.2 g, guaiacol allyl ether, 20.4 g; p-eugenol allyl ether 0.26 g; and o-eugenol allyl ether 0.28 g; p-eugenol, 9.79 g, o-eugenol, 8.46 g.

Acidification of the above aqueous layer and extraction with three 100 ml portions of diethyl ether followed by stripping of solvent and vacuum distillation gave 12.0 g of distillate boiling up to 106°C at 0.1 mm Hg). Its analysis by gas liquid chromatography showed the following: Guaiacol recovered, 2.03 g; guaiacol allyl ether 4.75 g; o-eugenol, 2.30 g; p-eugenol 2.65 g; p-eugenol allyl ether 0.09 g; and o-eugenol allyl ether 0.12 g.

From these data the direct yield is seen to be 15.2 percent with a true yield of 31.3 percent.

Having regard to the foregoing disclosure, the following is claimed as the inventive and patentable embodiments thereof:

1. A process for preparing an ortho-alkoxy-para allyl phenol which comprises allylating an ortho-alkoxy-phenol having the formula:

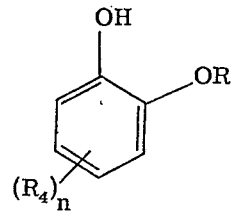

wherein R is an alkyl group having from one to about six carbon atoms, and $R_4$ is selected from the group consisting of hydrogen and methyl, $n$ is an integer from one to three, and $R_4$ when methyl is not in the para position, with an allyl compound having the formula:

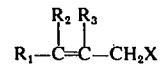

wherein $R_1$, $R_2$ and $R_3$ are selected from the group consisting of hydrogen and alkyl groups having from one to about six carbon atoms, and X is selected from the group consisting of halogen, sulfonate and sulfate, at a reaction temperature within the range from about 5° to about 150° C in the presence of an aqueous solution of an alkali or alkaline earth metal hydroxide; acidifying the reaction mixture; and recovering the allylated reaction product.

2. A process in accordance with claim 1, which comprises O-allylating the hydroxyl group of the ortho-alkoxy-phenol so that the allyl substituent becomes attached to the phenolic oxygen, and an ortho-alkoxy-allyl-phenyl-ether is obtained, separating the ortho alkoxy-allyl-phenol ether from the ortho-alkoxy-allyl-phenol, and cleaving the ortho-alkoxy-allyl-phenol ether to re-form ortho-alkoxy-phenol.

3. A process in accordance with claim 2, in which the cleavage product is recycled.

4. A process in accordance with claim 2, in which the cleavage is effected by reaction with alkali metal, resulting in formation of the alkali metal salt of the phenol, which is acidified to recover the starting ortho-alkoxy-phenol.

5. A process in accordance with claim 1, in which the alkali or alkaline earth metal hydroxide is selected from sodium hydroxide, potassium hydroxide, lithium hydroxide, calcium hydroxide, strontium hydroxide, and barium hydroxide.

6. A process in accordance with claim 1, in which the amount of allyl halide is within the range from about 0.25 to about 1.5 moles per mole of ortho-alkoxy-phenol.

7. A process in accordance with claim 1, in which the reaction is carried out in an aqueous solution of the base and a solution or dispersion of the ortho-alkoxy-phenol, the amount of water being within the range from about 50 to about 4000 ml per mole of ortho-alkoxy-phenol.

8. A process in accordance with claim 1, in which the reaction medium includes a water-miscible organic solvent selected from the group consisting of lower alkanols, lower ketones, and hydroxyalkyl amines in an amount up to about 50 percent by weight of the reaction medium.

9. A process in accordance with claim 1, in which the reaction mixture includes a surface-active agent to aid in dispersing the phenol or its alkali metal or alkaline earth metal salt.

10. A process in accordance with claim 1, in which the reaction temperature is within the range from about 5° to about 75°C.

11. A process according to claim 1, in which, after the reaction mixture is acidified to neutralize the base, the organic material is extracted from the aqueous mixture using a water-immiscible organic solvent which is a solvent for the ortho-alkoxy-para-allyl-phenol and any ortho-alkoxy-allyl-phenyl-ether.

12. A process according to claim 1, in which the acidification is effected with an inorganic acid.

13. A process according to claim 1, in which the acidification is effected with an organic acid.

14. A process according to claim 1, in which the acidification is effected with an inorganic acid selected so as to form a soluble salt of the cation of the base used.

15. A process for the cleavage of the allyloxy group from 1-allyloxy-2-alkoxy-phenyl-ethers and 1-allyloxy-2-alkoxy-4-allyl-phenyl ethers substantially without cleavage of the 2-alkoxy ether group, which comprises reacting a 1-allyloxy-2-alkoxy-4-allyl-phenyl-ether having the formula:

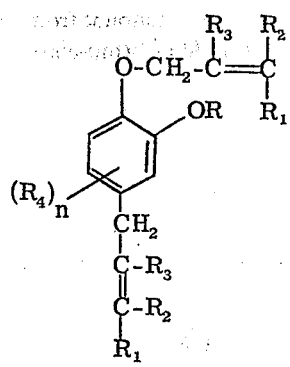

and a 1-allyoxy-2-alkoxy-phenyl ether having the formula:

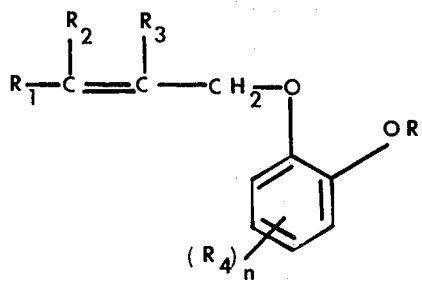

wherein R is an alkyl group having from one to about six carbon atoms; $R_1$, $R_2$ and $R_3$ are selected from the group consisting of hydrogen and alkyl groups having from one to about six carbon atoms, and $R_4$ is selected from the group consisting of hydrogen and methyl, n is an integer from 1 to 3, and $R_4$ when methyl is not in the para position, which comprises reacting the 1-allyloxy-2-alkoxy-phenyl-ether with alkali metal at a temperature within the range from about 50° to about 250°C to form the corresponding 2-alkoxy phenol.

16. A process in accordance with claim 15, in which the cleavage is effected at a temperature within the range from about 70° to about 200°C.

17. A process in accordance with claim 15, in which the cleavage is effected in the presence of a solvent selected from the group consisting of aliphatic, cycloaliphatic, aromatic and alkyl aromatic ethers or hydrocarbons.

18. A process in accordance with claim 17, in which the amount of solvent is within the range from about 50 ml up to about 5000 ml per mole of allyl-2-alkoxy-phenyl-ether or phenoxy ether.

19. A process in accordance with claim 15, in which the amount of alkali metal is within the range from one tenth the molecular amount required to cleave the ether, up to a molar excess of three times the stoichiometric amount.

20. A process in accordance with claim 15, in which the alkali metal is sodium.

21. A process in accordance with claim 1, which comprises allylating the ortho-alkoxy phenol in the presence of an aqueous solution of an alkali or alkaline earth metal hydroxide and an alkali metal salt.

22. A process in accordance with claim 21, in which the alkali metal salt is a sodium salt.

23. A process in accordance with claim 21, in which the alkali metal salt is in an amount from about 0.01 to about 1.1 moles per mole of ortho-alkoxy-phenyl.

24. A process in accordance with claim 21, in which the alkali metal salt is a salt of an inorganic acid.

25. A process in accordance with claim 21, in which the alkali metal salt is a salt of an organic acid.

* * * * *